United States Patent [19]
Kobayashi et al.

[11] Patent Number: 6,127,472
[45] Date of Patent: Oct. 3, 2000

[54] RUBBER COMPOSITION

[75] Inventors: Naokazu Kobayashi; Hiroshi Akema; Toshihiro Tadaki; Fumio Tsutsumi, all of Tokyo, Japan

[73] Assignee: JSR Corporation, Tokyo, Japan

[21] Appl. No.: 09/186,141

[22] Filed: Nov. 5, 1998

[30] Foreign Application Priority Data

Nov. 11, 1997 [JP] Japan .................................. 9-323902

[51] Int. Cl.$^7$ .............................. C08K 3/04; C08K 3/36; C08L 25/10; C08C 19/00
[52] U.S. Cl. ..................... 524/492; 524/495; 524/575; 525/332.9; 525/342
[58] Field of Search ................... 524/492, 495, 524/575; 525/332.9, 342

[56] References Cited

U.S. PATENT DOCUMENTS

| | | | |
|---|---|---|---|
| 4,547,560 | 10/1985 | Hattori et al. ................... | 526/340 |
| 4,742,124 | 5/1988 | Tsutsumi et al. . | |
| 5,331,036 | 7/1994 | Kang et al. . | |
| 5,527,860 | 6/1996 | Yamakawa et al. ................ | 525/342 |
| 5,569,697 | 10/1996 | Ferrandino et al. ................ | 524/492 |
| 5,733,963 | 3/1998 | Sandstrom et al. ................ | 524/492 |

OTHER PUBLICATIONS

Derwent Abstracts, DE 19547630, Jun. 26, 1997.
Derwent Abstracts, EP 609010, Aug. 3, 1994.
Derwent Abstracts, JP 3239737, Oct. 25, 1991.
Derwent Abstracts, JP 1022940, Jan. 25, 1989.
Derwent Abstracts, JP 61120389, Jun. 7, 1986.
Derwent Abstracts, EP 54911, Jun. 30, 1982.

*Primary Examiner*—Tae Yoon
*Attorney, Agent, or Firm*—Oblon, Spivak, McClelland, Maier & Neustadt, P.C.

[57] ABSTRACT

A rubber composition exhibiting excellent low rolling resistance, high wet skid properties, and superior wear resistance, and suitably used as a vulcanized rubber for tire tread. The rubber composition comprises a styrene-butadiene copolymer previously extended using an extender oil, in an amount from 30 to 100 wt % of the total rubber components, and an extender oil in an amount from 6 to 50 parts by weight for 100 parts by weight of the total rubber components, of which 20 to 50 parts by weight of the extender oil for 100 parts by weight of styrene-butadiene copolymer is used to previously extend the styrene-butadiene copolymer. The styrene-butadiene copolymer has a styrene content from 5 to 45 wt %, 20 to 80% of a microstructure 1,2-bond of butadiene portion, a glass transition temperature from −55° C. to −20° C., and 40 wt % or more of a single styrene bond and 10 wt % or less of long styrene chain which contains 8 or more styrene molecules, among the total styrene bonds.

10 Claims, No Drawings

RUBBER COMPOSITION

BACKGROUND OF THE INVENTION

1. Field of the Invention

The present invention relates to a rubber composition and, more particularly, to a rubber composition comprising a diene-type rubber as a principal rubber component, the diene-type rubber comprising a specific amount of a specific styrene-butadiene copolymer which has been previously extended using an extender oil. The rubber composition exhibits excellent low rolling resistance, high wet skid properties, and superior wear resistance so that the composition can be suitably used as a vulcanized rubber for tire tread, in particular.

2. Description of the Background

Development of a rubber material exhibiting reduced rolling resistance for use in tires is desired to respond to a recent demand for vehicles with a low fuel consumption. In order to reduce the rolling resistance of tires, an energy loss of vulcanized rubber at a low frequency should be decreased. Tires have a temperature of 50° C.–70° C. during operation. A frequency of the external force applied to the tires (or tread rubber), determined by the speed of the vehicle and the diameter of tires, is several tens of Hz. The smaller the energy loss under the low frequency conditions at the above temperature, the lower the fuel consumption of the tires. The concept of "an energy loss of vulcanized rubber under low frequency conditions" can thus be utilized as an index for evaluating the vulcanized rubber in relation to the fuel consumption under practical service conditions of tires. On the other hand, "tan β at 60° C." (wherein "tan δ" indicates an energy loss) is used as another index (laboratory index) for evaluating vulcanized rubber, which relates to the fuel consumption when a run is reproduced in a laboratory without causing a vehicle to actually run. The smaller the "tan δ at 60° C.", the lower the fuel consumption of the tires.

Another requirement for vehicles is the improvement of traveling stability. To respond to this requirement, a rubber material for tires which can increase the frictional resistance of tires on a wet road surface (wet grip) and the frictional resistance on a dry road surface (dry grip) is strongly desired. To increase the frictional resistance of tires on a road surface (particularly on a wet road surface) an energy loss of vulcanized rubber at high frequency should be increased. When a vehicle brakes, the temperature of the tires increases to 50° C.–70° C. In this instance, the tires (or tread rubber) receives an external force at a high frequency (on the order of several tens of thousands to several hundred thousands Hz) due to the invisible irregularity of the road surface. The larger the energy loss at this temperature under the high frequency conditions, the larger the friction resistance of the tires on the road surface, i.e. the tires have a superior grip power. Thus, the concept of "an energy loss of vulcanized rubber under high frequency conditions" can be utilized as an index for evaluation of the vulcanized rubber relating to the grip power in the practical service conditions of tires. However, because it is difficult to obtain a testing machine to measure the energy loss under such high frequency conditions, this cannot be used as a laboratory index of vulcanized rubber relating to grip power as is. Because of this, the frequency is converted into a temperature (under the conditions that the frequency is decreased and the temperature is lowered according to decrease in the frequency) to measure "tan δ at 0° C.", which is regarded as the laboratory index of vulcanized rubber relating to grip power. The larger the value of "tan δ at 0° C.", the better the performance of the tires in terms of grip power.

As can be understood from the above discussion, there is an antinomic relationship between low rolling resistance (a decrease in fuel consumption) and high friction resistance on a wet surface (an increase in traveling stability). It has been difficult to make these properties compatible. A number of rubber materials which have both of the properties have been proposed. Examples of materials that have been proposed heretofore include: a copolymer, obtained by the copolymerization of a conjugation diolefin and an aromatic vinyl compound using a lithium amide initiator (Japanese Patent Application Laid-open No. 279,515/1994), a styrene-butadiene copolymer, obtained by modifying or coupling the terminals of a polymer obtained using an organic lithium initiator (Japanese Patent Application Laid-open No. 22,940/1989), a rubber composition, comprising a styrene-butadiene rubber and a vinyl polybutadiene (Japanese Patent Application Laid-open No. 183,868/1997), and the like.

However, these rubber materials can not sufficiently satisfy the recently required values for both the above-mentioned properties.

Furthermore, the light weight for tires as well as the above-mentioned low rolling resistance are strongly demanded for the reduction of fuel consumption (fuel consumption improvement). Such a demand has encouraged development of vulcanized rubbers with superior wear properties. In order to decrease the fuel consumption, the energy loss (tan δ at 60° C.) of the rubber material itself used as tread must be decreased as mentioned above, and the tires must have a small thickness to reduce weight. Among these, decreasing the weight of tires (decreasing the thickness of tires) inevitably reduces the thickness of the tread. Because of this, development of vulcanized rubber with improved wear properties which can avoid a decrease in the life of tires is desired.

However, as mentioned above it is difficult to produce a rubber material for tires having both superior low rolling resistance and high friction resistance on a wet surface (high wet skid properties). It is even more difficult to provide a rubber material exhibiting improved wear resistance in addition to these properties.

The present invention has been completed in view of these problems and has an object of providing a rubber composition exhibiting excellent low rolling resistance, high wet skid properties, and superior wear resistance, which is suitable for use as a vulcanized rubber, particularly for high performance tires and low fuel consumption tire tread.

SUMMARY OF THE INVENTION

In order to achieve the above object, the present inventors have conducted extensive studies, and as a result, have found that a rubber composition exhibiting excellent low rolling resistance, high wet skid properties, and superior wear resistance can be obtained by adding a specific amount of a specific type styrene-butadiene copolymer which has been previously extended using an extender oil as a diene-type rubber component. This finding has led to the completion of the present invention.

Accordingly, a specific object of the present invention is to provide a rubber composition comprising:

① a diene-type rubber component comprising a styrene-butadiene copolymer which has been previously extended using an extender oil, in an amount from 30 to 100 wt % of the total rubber components, wherein said styrene-butadiene copolymer:
(a) has a styrene content from 5 to 45 wt %,
(b) has 20 to 80% of a microstructure 1,2-bond of butadiene portion, (c) has a glass transition temperature from −55° C. to −20° C., and (d) has 40 wt % or more of a single styrene bond and 10 wt % or less of long styrene chain which contains 8 or more styrene molecules, among the total styrene bonds, ② an extender oil in an amount from 6 to 55 parts by weight for 100 parts by weight of the total rubber components, of which 20 to 50 parts by weight of the extender oil for 100 parts by weight of styrene-butadiene copolymer is used to previously extend the styrene-butadiene copolymer.

In a preferred embodiment of the present invention, (e) the terminal of said styrene-butadiene copolymer is modified by at least one polyfunctional coupling agent which is selected from the group consisting of halogen-containing silicon compounds, alkoxy silane compounds, and alkoxy silane sulfide compounds.

In another preferred embodiment of the present invention, (f) said styrene-butadiene copolymer has a molecular weight distribution from 1.5 to 3.0, and preferably from 1.5 to 2.5.

In still another preferred embodiment of the present invention, (d') said styrene-butadiene copolymer has 40 to 80 wt % of a single styrene bond and 5 wt % or less of long styrene chain which contains 8 or more styrene molecules, among the total styrene bonds.

In a further preferred embodiment of the present invention, the rubber composition further comprises a filler which may be carbon black in an amount from 2 to 100 parts by weight for 100 parts by weight of the total rubber component or silica in an amount from 30 to 100 parts by weight for 100 arts by weight of the total rubber component, or both, and in the case silica is included, the rubber composition further comprises a silane coupling agent in an amount from 5 to 20 parts by weight for 100 parts by weight of silica.

In a particularly preferred embodiment of the present invention, the rubber composition comprises a mixture of carbon black and silica as filler in an amount from 30 to 100 parts by weight for 100 parts by weight of the total rubber component.

In a still further preferred embodiment of the present invention, the rubber composition is used as vulcanized rubber for tire tread.

Other and further objects, features and advantages of the present invention will appear more fully from the following description.

DETAILED DESCRIPTION OF THE INVENTION AND PREFERRED EMBODIMENTS (I) Rubber Composition The rubber composition of the present invention comprises a diene-type rubber as a principal component of rubber components. As one component of this diene-type rubber, the composition comprises a specific amount of a specific styrene-butadiene copolymer which has been previously extended using an extender oil.

1. Rubber Components (1) Diene-Type Rubber

The rubber composition of the present invention Comprises a diene-type rubber as a principal rubber component. A styrene-butadiene copolymer is a typical diene-type rubber.

① Styrene-Butadiene Copolymer (i) Characteristics

The styrene-butadiene copolymer used in the present invention possesses the characteristics (a) to (d) later described and, optionally, in addition to the characteristics (a) to (d), the characteristics (e) to (g) later described. Such a styrene-butadiene copolymer possessing the characteristics (a) to (d), and preferably the additional characteristics (e) to (g), is preferably obtained by the copolymerization of styrene and butadiene using a lithium-type initiator.

There are no specific restrictions to the initiator, which is used for the copolymerization of styrene and butadiene. Lithium-type initiators are preferred in view of the low cost, stability in the polymerization reaction, and the like. As the lithium-type initiators, organic lithium compounds are desirable.

Given as examples of the organic lithium compounds; alkyl lithium such as n-butyl lithium, sec-butyl lithium, and t-butyl lithium; alkylene dilithium, such as 1,4-dilithium butane; aromatic hydrocarbon lithium, such as phenyl lithium, stilbene lithium, diisopropenyl benzene lithium, a reaction product of an alkyl lithium (such as butyl lithium) and divinylbenzene or the like; polynuclear hydrocarbon lithium, such as lithium naphthalene; amino lithium; tributyltin lithium; and the like.

In addition to the polymerization initiator, an ether compound, tertiary amine, or the like can be used as a styrene randomization agent or as a microstructure modifier of the butadiene unit in the polymer during the copolymerization, as required. As examples of the ether compound and tertiary amine, dimethoxybenzene, tetrahydrofuran, dimethoxyethane, diethylene glycol dibutyl ether, diethylene glycol dimethyl ether, triethylamine, pyridine, N-methylmorpholine, N,N,N',N'-tetramethylethylenediamine, dipiperidinothane, and the like can be given.

As a polymerization solvent, n-hexane, cyclohexane, heptane, benzene, or the like can be used.

The polymerization can be carried out either by a batch system or continuous system, at a temperature suitably selected from the range usually from 0° C. to 130° C., and preferably from 10° C. to 100° C. The reaction time for the polymerization is suitably selected from the range usually from 5 minutes to 24 hours, and preferably from 10 minutes to 10 hours.

A monomer concentration, in terms of % by weight of the amount of monomers in the total amount of the monomers and solvents, is suitably selected from the range usually from 5 to 50 wt %, and preferably from 10 to 35 wt %.

In preparing the styrene-butadiene copolymers using a lithium catalyst, it is desirable to avoid contamination of the polymerization system with a compound which may deactivate the lithium catalyst, such as a halogen compound, oxygen, water, carbon dioxide gas, and the like.

Characteristics desired for the styrene-butadiene copolymer used in the composition of the present invention will now be described.

(a) Content of Styrene

The content of styrene in the styrene-butadiene copolymer used in the present invention is from 5 to 45 wt %, and preferably from 15 to 45 wt %. If the content of the styrene is less than 5 wt %, the wear resistance of the resulting rubber composition will be inadequate. If more than 45 wt %, a hysteresis loss in the temperature range from 50 to 80° C. increases. Here, the hysteresis loss is a concept to indicate a fuel consumption which has a correlation with an energy loss (tan δ at 60° C.)). The styrene content can be adjusted by changing the ratio of styrene and butadiene when the copolymer is prepared.

(b) Content of 1,2-Bond Having a Microstructure of Butadiene Portion

The content of the microstructure 1,2-bond of butadiene portion in the styrene-butadiene copolymer used in the present invention is from 20 to 80%, preferably from 25 to 70%, and more preferably from 30 to 70%. If less than 20%, wet skid properties (wet grip properties) of the resulting composition are insufficient; if more than 80%, wear resistance is insufficient. The content of the microstructure 1,2-bond can be adjusted by adding a polar compound such as the above-mentioned ether compound and tertiary amine as a microstructure modifier.

(c) Glass Transition Temperature

The glass transition temperature of the styrene-butadiene copolymer used in the present invention is from −55° C. to −20° C., and preferably from −45° C. to −30° C. If the glass transition temperature is less than −55° C., the wet skid properties (wet grip properties) are insufficient; if higher than −20° C., the fuel consumption increases. The glass transition temperature can be adjusted by the styrene content and the microstructure 1,2-bond (vinyl) of butadiene portion. The glass transition temperature, the styrene content, and the microstructure of butadiene portion have such a relationship that when the styrene content and the content of the microstructure 1,2-bond (vinyl) of butadiene portion increase, the glass transition temperature increases. Specifically, when the styrene content increases 1 wt %, the glass transition temperature increases 1° C.; and when the content of the microstructure 1,2-bond (vinyl) of butadiene portion increases 2%, the glass transition temperature increases 1° C. It is possible to adjust the styrene content by controlling the feed rate of styrene during the polymerization, for instance. The content of the microstructure 1,2-bond (vinyl) of butadiene portion can be adjusted by controlling the amount of the polar compound such as an ether compound or tertiary amine compound added during the polymerization, because an increase in the amount of the polar compound results in an increase in the content of 1,2-bond (vinyl). This polar compound can also function as a randomizer for styrene.

(d) Proportions of Single Styrene Bond and Long Chain Styrene Molecules in Styrene Units The styrene-butadiene copolymer used in the present invention has 40 wt % or more of a single styrene bond and 10 wt % or less of long styrene chain which contain 8 or more styrene molecules, respectively among the total styrene bonds. A more preferable proportion of the single styrene bond is from 40 to 80 wt % and a more preferable proportion of the long styrene chains is 5 wt % or less. If the proportion of the single styrene bond in the total combined styrene is less than 40 wt % or if the proportion of the long chains containing 8 or more styrene molecules is more than 10 wt %, low rolling resistance of the resulting rubber composition is insufficient. The proportion of the single styrene bond and long chains in the styrene unit can be adjusted by (1) a method of controlling the polymerization temperature, (2) a method of continuously introducing butadiene, or the like. Specifically, when a lithium-type initiator is used, the rate of polymerization (reaction) not only differs for styrene and butadiene, but also is affected by the polymerization temperature and the monomer concentrations. Because of these reasons, when styrene and butadiene are simply reacted, styrene is more reactive during the latter half of polymerization when the temperature is high, due to the effect of temperature and a larger concentration of styrene monomer in the reaction mixture. This results in the formation of a large amount of long chain styrene and thus a higher proportion of long chains. To appropriately adjust the proportion of the single styrene bond and long chain styrene, the formation of a large amount of long chains can be decreased by the above methods (1) or (2). In the method (1), the polymerization temperature is controlled so that the reaction rate of the styrene and that of the butadiene are maintained equivalent. In the method (2), the reaction is initiated with a reduced initial amount of butadiene and then a balance of butadiene is continuously fed to appropriately control the length of the produced styrene chains (i.e. appropriately control the proportion of the single bond and long chain).

(e) Modification of the Polymer Terminal by Poly-Functional Coupling Agents

The styrene-butadiene copolymer used in the present invention may have a branched structure introduced as required. As examples of the copolymer into which a branched structure is introduced,(1) the copolymer, of which the terminal is modified by one or more poly-functional coupling agents, and (2) the copolymer, produced by the polymerization in the presence of a small amount of a branching agent, can be given. A specific method of introducing such a branched structure according to the method (1), using poly-functional coupling agents comprises reacting the reactive polymer having a lithium reactive terminal which is obtained by a batch polymerization or continuous polymerization with one or more poly-functional coupling agent selected from the group consisting of halogen-containing silicon compounds such as silicon tetrachloride, alkoxysilane compounds, alkoxysilane sulfide compounds, polyepoxy compounds, urea compounds, amide compounds, imido compounds, thiocarbonyl compounds, and lactam compounds. Among these poly-functional coupling agents, halogen-containing silicon compounds such as silicon tetrachloride, alkoxysilane compounds, and alkoxysilane sulfide compounds are desirable in view of the low cost and reaction stability. When the polymerization is carried out in the presence of a small amount of branching agents according to the method (2), a small amount of divinylbenzene, for instance, is used as the branching agent. Introduction of the branched structures makes it easy to break entangling among polymers, thereby increasing the processability of the copolymer, specifically by decreasing the Mooney viscosity ($ML_{1+4}$, 100° C.). However, if the amount of the branched structures introduced is too large, gelling may occur, which impairs processability. Because of this, the amount of the branched structures introduced should be large enough to increase the processability, but should not be so large as to impair fuel consumption, wear resistance, low rolling resistance, and the like. A preferable amount is less than 10%, for example.

(f) Molecular Weight Distribution

Although there are no specific limitations to the molecular weight distribution (weight average molecular weight/number average molecular weight) of the styrene-butadiene copolymer which is used in the present invention, the molecular weight distribution is preferably in the range from 1.5 to 3.0, more preferably from 1.5 to 2.5, and even more preferably from 1.5 to 2.1. When less than 1.5, rolling processability and injection processability will be insufficient; if more than 3.0, rolling performance may become inadequate. The molecular weight distribution can be adjusted by controlling the polymerization temperature or by using a allene compound chain transfer agent such as 1,2-butadiene or 1,2-isoprene.

(g) Mooney Viscosity

Although there are no specific limitations to the Mooney viscosity (OE-$ML_{1+4}$, 100° C.) of the oil-extended styrene-butadiene copolymer which is used in the present invention, the Mooney viscosity is preferably in the range from 20 to 100, and more preferably from 30 to 80. If less than 20, the breaking strength may be insufficient; if more than 100, rolling processability and injection processability will be impaired. The Mooney viscosity can be adjusted by controlling the molecular weight distribution or weight average molecular weight.

(ii) The Amount of Styrene-Butadiene Copolymer

The styrene-butadiene copolymer is contained in the composition of the present invention, as an extended product using an extender oil which is later described, in the amount from 30 to 100 wt %, and preferably from 50 to 100 wt %. If less than 30 wt %, high wet skid properties and low rolling resistance become insufficient.

② Diene-Type Rubbers Other Than Styrene-Butadiene Copolymer

Diene-type rubbers other than the above-mentioned styrene-butadiene copolymers can also be included in the rubber composition of present invention. As examples of such other diene-type rubbers, natural rubbers, polyisoprene rubbers, high cis-1,4-bondpolybutadiene rubbers, and the like are given. The proportion of the diene-type rubber other than the styrene-butadiene copolymer in the total rubber components is in the range from 0 to 70 wt %.

(2) Rubber Components Other Than Diene-Type Rubbers

Rubber components other than the above-mentioned diene-type rubbers may be used as the rubber component in the composition of the present invention. As such other rubber components, ethylene-propylene rubber, silicone rubber, vinylidene fluoride rubber, and the like can be given. The amount of such rubber components other than the diene-type rubbers is usually from 0 to 30 wt % in the total amount of the rubber components.

2. Extender Oil

The styrene-butadiene copolymer used in the present invention must be previously extended using an extender oil. Such a previous extension using an extender oil ensures excellent dispersion of extender oil and later-described fillers in the rubber components as compared with a compounded rubber in which the oil is kneaded during compounding operation.

(1) Types of Extender Oils

Naphthene-type, paraffin-type, and aromatic oil-type extender oils can be used in the present invention without any specific limitations inasmuch as such extender oils are those commonly used with rubbers. Among these, aromatic-type extender oils are preferred. A combined use of naphthene-type and paraffin-type extender oils for rubber is also acceptable. When a rubber extender oil is used, such an extender oil has a viscosity-specific gravity constant of ASTM 02501 in the range preferably from 0.900 to 1.100, and more preferably from 0.920 to 0.990. There are no specific limitations to the method of extension using oil. One example of such a method comprises adding an extender oil to the styrene-butadiene copolymer after the polymerization, removing the solvent, and drying of the product by a conventional method.

(2) The amount of Extender Oils

① The Amount of Extender Oils Used for Previously Extending the Styrene-Butadiene Copolymer The amount of extender oils used for previously extending the styrene-butadiene copolymer is from 20 to 50 parts by weight, and preferably from 30 to 40 parts by weight, for 100 parts by weight of the styrene-butadiene copolymer. If the amount of extender oils is less than 20 parts by weight, low rolling resistance of the resulting rubber composition is inadequate. The use of extender oils in an amount more than 50 parts by weight results in the restricted formulation freedom of components due to the high lower limit of the total amount of oils in the compounded rubber.

② The Amount of Total Extender Oils Used for the Total Rubber Components

The extender oils may be formulated to the rubber composition of the present invention in addition to the above-described purpose for extending the styrene-butadiene copolymer. One example is preparation of a carbon master batch (CMB). In the preparation of the CMB, fillers and extender oils are further added to the styrene-butadiene copolymer which have previously been extended with the extender oils, and the mixture is kneaded. Another example is preparation of tires from CMB, wherein the CMB, other diene rubbers, and additives are kneaded together with the extender oils. In these instances, the total amount of the extender oils (used for extension and formulation) is from 6 to 55 parts by weight, and preferably from 10 to 50 parts by weight, for 100 parts by weight of the total rubber components. If less than 6 parts by weight, it is difficult to ensure both superior processability and low fuel consumption. If more than 55 parts by weight, it is difficult to ensure adequate low fuel consumption.

3. Components Other Than Rubber Components and Extender Oils

In addition to the above-described rubber components and extender oils to be separately formulated, various components such as fillers, vulcanizing agents, vulcanization accelerators, anti-oxidants, and the like can be added to the rubber composition of the present invention.

(1) Fillers

Carbon black, silica, clay, calcium carbonate, magnesium carbonate, and the like can be given as examples of the fillers which can be used in the present invention. When carbon black is used, the proportion formulated is preferably from 2 to 100 parts by weight, and more preferably from 10 to 60 parts by weight, for 100 parts by weight of the rubber components. If less than 2 parts by weight, weather resistance and electric conductivity may be insufficient; if more than 100 parts by weight, impact resilience and low rolling resistance may be impaired. When silica is used, the proportion formulated is preferably from 30 to 100 parts by weight, and more preferably from 35 to 70 parts by weight, for 100 parts by weight of the rubber components. If less than 30 parts by weight, wet skid properties may be insufficient; if more than 100 parts by weight, low rolling resistance may be impaired. In addition, when silica is formulated as a filler, it is desirable to further add a silane coupling agent in an amount from 5 to 20 parts by weight for 100 parts by weight of silica. Moreover, carbon black and silica may be used jointly. In this instance, the total amount of carbon black and silica used is preferably from 30 to 100 parts by weight for 100 parts by weight of the rubber component.

(2) Vulcanizing Agent

As examples of vulcanizing agents used in the present invention, sulfur, peroxides such as di-t-butyl peroxides, and sulfur-donating compounds such as tetramethylthiuram disulfide can be given. Of these, sulfur is preferable in view of ensuring durability of the resulting rubber composition. The amount of the vulcanizing agents is preferably from 0.5 to 5 parts by weight for 100 parts by weight of the total rubber components.

(3) Vulcanization Accelerator

As examples of vulcanization accelerators used in the present invention, diphenylguanidine, N-tetra-butyl-2-benzothiazole sulfenamide, N-cyclohexyl-2-benzothiazole sulfenamide, and the like can be given. The amount of vulcanization accelerators is preferably from 1 to 5 parts by weight for 100 parts by weight of the total rubber components.

(4) Anti-Oxidants

As examples of the anti-oxidants used in the present invention, N-phenyl-N'-isopropyl-p-phenylenediamine, N-(1,3-dimethylbutyl)-N'-phenyl-p-phenylenediamine, and the like can be given. The amount of anti-oxidants used in the composition of the present invention is preferably from 1 to 10 parts by weight for 100 parts by weight of the total amount of the rubber components.

(5) The Other Additives

Processing auxiliaries and tackifiers such as stearic acid, zinc white, wax, and the like can be given as other additives used in the present invention.

(II) Method for Preparing Rubber Compositions

There are no specific restrictions to the method for preparing the rubber composition of the present invention. One example of such a method comprises; kneading the styrene-butadiene copolymer (previously extended with an extender oil), with optional components, such as additional extender oil, fillers, vulcanizing agents, vulcanization accelerators, anti-oxidants, and the like, using a rubber kneader, such as an internal mixer, open roller mill, or the like. The resulting vulcanizable rubber of the present invention is fabricated and vulcanized at a temperature from 130° C. to 200° C. to obtain vulcanized rubber.

(III) Vulcanized Rubber

Because the vulcanized rubber obtained from the rubber composition of the present invention exhibits extremely excellent low rolling resistance and superior wet skid performance, the rubber can be suitably used for tires, particularly for high performance tires and tire treads. The composition is also useful as a material for other tires and common applications of vulcanized rubber. The rubber composition thus has a high industrial significance.

As described above, the present invention provides a rubber composition exhibiting superior low rolling resistance, high wet skid properties, and superb wear resistance. It is also useful for production of vulcanized rubber, which is suitable as a raw material for high performance, low fuel consumption tires and tire treads, as well as for common vulcanized rubber of a wide use.

The present invention will now be described by way of examples, which should not be construed as limiting of the present invention.

EXAMPLES

In the examples below, various properties of styrene-butadiene copolymers were measured according to the following methods.

Styrene Content (%)

The styrene content was measured by IR spectroscopy using a calibration curve.

1,2-Bond Content of Butadiene Portion (%)

IR spectroscopy (Morelo method) was used.

Glass Transition Temperature (° C.)

The glass transition temperature was determined by measuring an extrapolation initiation temperature using a differential scanning calorimeter (DSC), manufactured by SEIKO Electronics Industry Co., Ltd., at a heating rate of 10° C./minute.

Weight Average Molecular Weight, Number Average Molecular Weight, and Molecular Weight Distribution Polystyrene-reduced values were measured by GPC (gel permeation chromatograph).

Distribution of Styrene Chains

Distribution of styrene chains was determined by decomposing all butadiene double bonds in the styrene-butadiene copolymer by ozone cleavage and analyzing the resulting product using GPC (see Blueprint of The Society of Polymer Science, Japan, Vol. 2, Page 055).

Mooney Viscosity (OE-$ML_{1+4}$, 100° C.)

The Mooney viscosity was measured according to JIS K6300 with a preheating time of one minute and a rotor operation time of 4 minutes at a temperature of 100° C.

Various properties of the test specimens produced from vulcanized rubbers, prepared from the rubber composition, were measured according to the following methods.

Tan δ tan δ at 60° C. was measured using a dynamic analyzer (RDA) manufactured by Rheometrix Co. (U.S.A) under the conditions of dynamic strain of 1% and a frequency of 10 Hz at 60° C. The smaller the value of tan δ at 60° C., the smaller the rolling resistance, thus the performance is better. tan δ at 0° C. was measured using the same equipment under a dynamic strain of 0.5% and a frequency of 10 Hz at 0° C. The larger the value of tan δ at 0° C., the larger the wet skid properties are, and thus the performance of the vulcanized product is better.

Lanbourn Wear Index (Wear Resistance)

Wear resistance was measured at room temperature using a Lanbourn-type wear tester. The index shows the wear amount at a 60% slip ratio. The larger the index, the better the wear is.

Hardness

Hardness was measured using a type (A) JIS hardness tester at a temperature of 25° C.

The reason for a hardness measurement is because the tire treads are not acceptable for practical use, if they are either too hard or too soft. In addition, if the fluctuation of hardness is too large, it is difficult to compare fuel consumption and wet grip by tan δ at 60° C. and tan δ at 0° C.

Examples 1–9, Comparative Example 1–10

Preparation of Copolymer and Extension with Extender Oil

Copolymers A to M shown in Table 1 were prepared as follows:

Copolymers A and F

A 5 l autoclave reaction vessel of which the internal atmosphere was replaced by nitrogen was charged with 175 g of styrene, 325 g of 1,3-butadiene containing 150 ppm of 1,2-butadiene, 2,500 g of cyclohexane, 8.75 g of tetrahydrofuran, and 0.068 g of potassium dodecylbenzenesulfonate. After adjusting the temperature of the content in the reaction vessel to 15° C., 3.91 mmol of n-butyl lithium was added to initiate the polymerization. When the polymerization conversion ratio reached 100%, 3.51 mmol of methyltriphenoxysilane was added to effect a modification reaction for 15 minutes to obtain Copolymers A and F.

Copolymer B

A 5 l autoclave reaction vessel of which the internal atmosphere was replaced by nitrogen was charged with 110 g of styrene, 385 g of 1,3-butadiene, 3,025 g of cyclohexane, and 36 g of tetrahydrofuran. After adjusting the temperature of the content in the reaction vessel to 35° C., 4.15 mmol of n-butyl lithium was added to initiate the polymerization. Starting from five minutes after the polymerization reaction, 55 g of 1,3-butadiene was continuously introduced at a rate of 5 g/minute. When the polymerization conversion ratio reached 100%, 0.55 mmol of silicon tetrachloride was added to effect a modification reaction for 15 minutes to obtain the Copolymer B.

Copolymer C

Copolymer C was prepared in the same manner as the Copolymer B, except for changing the amount of styrene to 165 g, 1,3-butadiene to 332 g, and tetrahydrofuran to 9 g.

Copolymer D

A 20 l jacketed autoclave reaction vessel equipped with a stirrer, of which the internal atmosphere was replaced by nitrogen, was continuously charged with styrene (6 g/minute), 1,3-butadiene containing 100 ppm of 1,2-butadiene (24 g/minute), cyclohexane (150 g/minute), tetrahydrofuran (4.17 g/minute), and n-butyl lithium (0.196 mmol/minute). The temperature of the reaction vessel was controlled at 70° C. Silicon tetrachloride was continuously fed at a rate of 0.06 mmol/minute from the top of the first reaction vessel, then introduced into the second reaction vessel to effect a modification reaction, thereby obtaining Copolymer D.

Copolymer E

Copolymer E was prepared in the same manner as the Copolymer D, except that the amount of styrene was changed to 10.5 g/minute, 1,3-butadiene containing 100 ppm of 1,2-butadiene to 19.5 g/minute, tetrahydrofuran to 0.97 g/minute, and n-butyl lithium to 0.144 mmol/minute and, in addition, 0.052 g/minute of methyltriphenoxysilane was used instead of the silicon tetrachloride.

Copolymer G

Copolymer G was prepared in the same manner as the Copolymer B, except that the amount of 1,3-butadiene was changed to 357 g, and the continuous addition of 1,3-butadiene during the polymerization reaction was omitted.

Copolymer H

Copolymer H was prepared in the same manner as the Copolymer B, except that the amount of n-butyl lithium was changed to 3.82 mmol.

Copolymer I

Copolymer I was prepared in the same manner as the Copolymer D, except for feeding 24 g/minute of 1,3-butadiene containing 130 ppm of 1,2-butadiene instead of the 24 g/minute of 1,3-butadiene containing 100 ppm of 1,2-butadiene.

Copolymer J

Copolymer J was prepared in the same manner as the Copolymer B, except that the amount of styrene was changed to 138 g, 1,3-butadiene to 358 g, and tetrahydrofuran to 7 g.

Copolymer K

Copolymer K was prepared in the same manner as the Copolymer B, except that the amount of styrene was changed to 28 g, 1,3-butadiene to 468 g, and tetrahydrofuran to 135 g.

Copolymer L

Copolymer L was prepared in the same manner as the Copolymer B, except that the amount of styrene was changed to 248 g, 1,3-butadiene to 248 g, and tetrahydrofuran to 1 g.

Copolymer M

Copolymer M was prepared in the same manner as in the Copolymer B, except that the amount of styrene was changed to 165 g, 1,3-butadiene to 330 g, and tetrahydrofuran to 115 g.

The Copolymer F was extended using a naphthene-type extender oil (Fukkol FLEX #1060N, manufactured by Fuji Kosan Co., Ltd.) in an amount of 37.5phr (parts per 100 parts rubber). Copolymers other than F and I were extended using an aromatic-type extender oil (Fukkol Aromax #3, manufactured by Fuji Kosan Co., Ltd.) in an amount of 37.5 phr. Copolymer I was not extended with oil. Among these styrene-butadiene copolymers, Copolymers A–F are the styrene-butadiene copolymers of the present invention and Copolymers G–M are comparative styrene-butadiene copolymers.

Preparation of Rubber Compositions and Vulcanized Rubber

The rubber compositions of Examples 1–9 and Comparative Examples 1–10 were prepared from the styrene-butadiene copolymers A–M prepared in the above Examples and Comparative Examples according to the formulations X, Y, and Z shown in Table 2. First, mixtures of the components, except for the vulcanizing agents, were kneaded using a Banbury mixer (BR-type, manufactured by Kobe Steel Co., Ltd.) at a start temperature of 70° C. and stirring at 60 rpm for 3 minutes. Next, the mixtures were kneaded with the addition of vulcanizing agents at a start temperature of 70° C. and stirring at 50 rpm for 1 minute to obtain the rubber compositions.

TABLE 2

| Formulation | X | Y | Z |
| --- | --- | --- | --- |
| Components (parts) | | | |
| Rubber component (*1) | 100 | 100 | 100 |
| Carbon black (*2) | 75 | 7 | 15 |
| Silica (*3) | — | 70 | 80 |
| Silane coupling agent (*4) | — | 7 | 8 |
| Aromatic oil (*5) | 37.5 | 37.5 | 60 |
| Zinc white | 3 | 3 | 3 |
| Stearic acid | 2 | 2 | 2 |
| Antioxidant (*6) | 1 | 1 | 1 |
| Wax | 2 | 2 | 2 |
| Vulcanization accelerator CZ (*7) | 2 | 2 | 2 |
| Vulcanization accelerator D (*8) | — | 1.5 | 1.5 |
| Sulfur | 2 | 2 | 2 |

(*1) The rubber component includes styrene-butadiene copolymer, natural rubber, and high-cis-butadiene rubber, of which the compositions are shown in Tables 3 and 4. For extended polymers, the amount excluding an extender oil is shown.
(*2) Diablack N339 manufactured by Mitsubishi Chemical Corp.
(*3) Nipsil AQ manufactured by Nippon Silica Co., Ltd.
(*4) Si69 manufactured by Degussa Co.
(*5) Fukkol Aromax #3 manufactured by Fuji Kosan Co., Ltd.
(*6) Noclack 810NA manufactured by Ouchi Shinko Kagaku K.K.
(*7) Nocseller CZ manufactured by Ouchi Shinko Kagaku K.K.
(*8) Nocseller D manufactured by Ouchi Shinko Kagaku K.K.

Then, the rubber compositions were vulcanized at 160° C. for 20 minutes using a vulcanizing press and a mold to obtain test specimens. Properties of the vulcanized rubber were measured using the test specimens. The results are shown in Table 3.

TABLE 1

| | Styrene content (%) | Butadiene 1,2-bond (%) | Glass transition temperature (° C.) | Molecular weight distribution | Single styrene bond (%) | Long chain of 8 or more styrenes (%) | Amount of extender oil (phr) | Mooney viscosity |
| --- | --- | --- | --- | --- | --- | --- | --- | --- |
| A | 35 | 46 | −33 | 1.6 | 54.9 | 0.5 | 37.5 | 37 |
| B | 20 | 60 | −36 | 1.6 | 41.0 | 2.5 | 37.5 | 35 |
| C | 30 | 35 | −45 | 1.5 | 60.1 | 5.4 | 37.5 | 39 |
| D | 25 | 73 | −20 | 3.0 | 58.7 | 1.1 | 37.5 | 50 |
| E | 35 | 46 | −33 | 2.8 | 53.1 | 0.7 | 37.5 | 78 |
| F | 35 | 47 | −36 | 1.6 | 56.2 | 0.3 | 37.5 | 38 |
| G | 36 | 46 | −34 | 1.6 | 35.9 | 13.1 | 37.5 | 61 |
| H | 35 | 46 | −33 | 1.7 | 55.7 | 0.9 | 15 | 82 |
| I | 25 | 72 | −21 | 4.9 | 56.6 | 2.9 | − | 71 |
| J | 25 | 31 | −59 | 1.6 | 51.1 | 4.2 | 37.5 | 41 |
| K | 4 | 83 | −26 | 1.6 | 52.3 | 0.1 | 37.5 | 43 |
| L | 47 | 15 | −55 | 1.6 | 59.3 | 5.9 | 37.5 | 38 |
| M | 30 | 70 | −16 | 1.5 | 55.4 | 2.2 | 37.5 | 40 |

TABLE 3

| | Example | | | | | | | | |
|---|---|---|---|---|---|---|---|---|---|
| | 1 | 2 | 3 | 4 | 5 | 6 | 7 | 8 | 9 |
| Formulations | X | Y | Y | Y | Y | Y | Y | Y | Y |
| Rubber component (parts) | | | | | | | | | |
| Copolymer No. | A | A | B | C | D | A | A | E | F |
| Amount of copolymer (parts) (*1) | 96.25 | 96.25 | 96.25 | 96.25 | 96.25 | 55 | 96.25 | 96.25 | 96.25 |
| (styrene-butadiene copolymer) | (70) | (70) | (70) | (70) | (70) | (40) | (70) | (70) | (70) |
| Natural rubber | 30 | 30 | 30 | 30 | 30 | 60 | — | 30 | 30 |
| BR01 (*2) | — | — | — | — | — | — | 30 | — | — |
| Vulcanized rubber properties | | | | | | | | | |
| tan δ at 0° C. | 0.59 | 0.64 | 0.49 | 0.45 | 0.74 | 0.55 | 0.35 | 0.64 | 0.63 |
| tan δ at 60° C. | 0.22 | 0.15 | 0.14 | 0.13 | 0.17 | 0.16 | 0.16 | 0.14 | 0.13 |
| Wear resistance Index) | 112 | 100 | 95 | 110 | 90 | 97 | 120 | 105 | 103 |
| Hardness (25° C., JIS A) | 68 | 69 | 69 | 70 | 69 | 69 | 70 | 68 | 67 |

TABLE 4

| | Comparative Example | | | | | | | | | |
|---|---|---|---|---|---|---|---|---|---|---|
| | 1 | 2 | 3 | 4 | 5 | 6 | 7 | 8 | 9 | 10 |
| Formulations | X | Y | Y | Y | Y | Z | Y | Y | Y | Y |
| Rubber component (parts) | | | | | | | | | | |
| Copolymer No. | G | H | I | J | A | A | G | K | L | M |
| Amount of copolymer (parts) (*1) | 96.25 | 80.5 | 70 | 96.25 | 27.5 | 96.25 | 96.25 | 96.25 | 96.25 | 96.25 |
| (styrene-butadiene copolymer) | (70) | (70) | (70) | (70) | (20) | (70) | (70) | (70) | (70) | (70) |
| Natural rubber | 30 | 30 | 30 | 30 | 80 | 30 | — | 30 | 30 | 80 |
| BR01 (*2) | — | — | — | — | — | — | 30 | — | — | — |
| Vulcanized rubber properties | | | | | | | | | | |
| tan δ at 0° C. | 0.55 | 0.59 | 0.65 | 0.21 | 0.51 | 0.55 | 0.31 | 0.69 | 0.25 | 0.78 |
| tan δ at 60° C. | 0.24 | 0.17 | 0.19 | 0.13 | 0.18 | 0.21 | 0.18 | 0.17 | 0.15 | 0.19 |
| Wear resistance Index) | 103 | 91 | 79 | 107 | 85 | 93 | 113 | 74 | 102 | 81 |
| Hardness (25° C., JIS A) | 70 | 71 | 70 | 70 | 68 | 67 | 70 | 69 | 71 | 70 |

(*1) The amount includes an extender oil for extended copolymers.
(*2) High-cis-butadiene rubber manufactured by JSR Corp.

As can be seen from the above Tables, the rubber compositions of Comparative Examples 1, 4, and 7–10 do not satisfy the requirements (a)–(d), for the styrene-butadiene copolymer (i.e. these compositions do not have (a) a styrene content of 5–45 wt %, butadiene 1,2-bond content of 20–80%; glass transition temperature of −55° C. to −20° C., and do not satisfy the styrene chain distribution of 40 wt % or more for a single styrene bond and 10 wt % or less for longer chains). Specifically, as can be seen from Table 1, Copolymer G used in Comparative Examples 1 and 7 (in Table 4) has a single styrene bond content of 35.9 wt % and a long chain content of 13.1 wt %, both outside the required range for the styrene chain distribution; Copolymer J, used in Comparative Example 4, has a glass transition temperature of 6–59° C.; Copolymer K, used in Comparative Example 8, has a styrene content of 4% and butadiene 1,2-bond content of 83%; Copolymer L, used in Comparative Example 9, has a styrene content of 47%; Copolymer M, used in Comparative Example 10, has a glass transition temperature of −16° C. All these copolymers thus do not satisfy the requirements (a) to (d) for the styrene-butadiene copolymers.

The rubber compositions of Comparative Example 2, 3, 5, and 6 do not satisfy the other requirements for the rubber composition of the present invention. Specifically, Copolymer H, used in Comparative Example 2 shown in Table 4, was extended only using 15 parts by weight of extender oil, as shown in Table 1. This does not meet the requirements for previously extending the styrene-butadiene copolymer of the present invention using an extender oil in an amount from 20 to 50 parts by weight for 100 parts by weight the styrene-butadiene copolymer. Copolymer I used in Comparative Example 3 (shown in Table 4), was not extended with an extender oil, failing to satisfy the requirement for the composition of the present invention of using a styrene-butadiene copolymer, which has been previously extended using an extender oil in an amount from 30 to 100 wt % of the total rubber components. In addition, the Copolymer I has a molecular weight distribution of 4.9, which is broader than required.

The rubber composition of Comparative Example 5 contains only 20 wt % of the styrene-butadiene copolymer rubber (as shown in Table 5), also failing to satisfy the requirement for the composition of comprising a styrene-butadiene copolymer which has been previously extended using an extender oil in an amount from 30 to 100 wt %, of the total rubber components.

The rubber composition of Comparative Example 6 (shown in Table 4), comprises the formulation Z which contain 60 parts by weight of an extender oil in total for 100 parts by weight of the total rubber components (as shown in Table 2). This is against the requirement for the composition of the present invention that the total amount of an extender oil is from 6 to 50 parts by weight for 100 parts by weight of the total rubber components.

Consequently, as can be clearly seen from Table 4, the vulcanized rubbers of Comparative Examples 1–10 exhibit inferior properties in terms of low rolling resistance, high wet skid performance, and wear resistance as compared with the vulcanized rubbers of Examples 1–9.

Obviously, numerous modifications and variations of the present invention are possible in light of the above teachings. It is therefore to be understood that within the scope of the appended claims, the invention may be practiced otherwise than as specifically described herein.

What is claimed is:

1. A rubber composition comprising:

① a diene-based rubber component comprising a styrene-butadiene copolymer which has been previously extended using an extender oil, in an amount from 30 to 100 wt % of the total rubber components, wherein said styrene-butadiene copolymer:

(a) has a styrene content from 5 to 45 wt %, (b) has 20 to 80% of a microstructure 1,2-bond of butadiene portion, (c) has a glass transition temperature from −55° C. to −20° C., and (d) has 40 wt % or more of a single styrene bond and 10 wt % or less of long styrene chain which contains 8 or more styrene molecules, among the total styrene bonds, ② an extender oil in an amount from 6 to 55 parts by weight for 100 parts by weight of the total rubber components, of which 20 to 50 parts by weight of the extender oil for 100 parts by weight of styrene-butadiene copolymer is used to previously extend the styrene-butadiene copolymer.

2. The rubber composition according to claim 1, wherein the terminal of said styrene-butadiene copolymer is modified by at least one polyfunctional coupling agent which is selected from the group consisting of halogen-containing silicon compounds, alkoxy silane compounds, and alkoxy silane sulfide compounds.

3. The rubber composition according to claim 1, wherein said styrene-butadiene copolymer has a molecular weight distribution from 1.5 to 3.0.

4. The rubber composition according to claim 1, wherein said styrene-butadiene copolymer has a molecular weight distribution from 1.5 to 2.5.

5. The rubber composition according to claim 1, wherein said styrene-butadiene copolymer has 40 to 80 wt % of a single styrene bond and 5 wt % or less of long styrene chain which contains 8 or more styrene molecules, among the total styrene bonds.

6. The rubber composition according to claim 1, further comprising a filler which is carbon black in an amount from 2 to 100 parts by weight for 100 parts by weight of the total rubber component or silica in an amount from 30 to 100 parts by weight for 100 parts by weight of the total rubber component, or both, and in the case silica is included, the rubber composition further comprises a silane coupling agent in an amount from 5 to 20 parts by weight for 100 parts by weight of silica.

7. The rubber composition according to claim 1, further comprising a mixture of carbon black and silica as filler in an amount from 30 to 100 parts by weight for 100 parts by weight of the total rubber component.

8. The rubber composition according to claim 1, wherein said styrene-butadiene copolymer has a styrene content of 15 to 45 wt.%.

9. The rubber composition according to claim 1, wherein said styrene-butadiene copolymer has 25 to 70% of a microstructure 1,2-bond of butadiene portion.

10. The rubber composition according to claim 4, wherein styrene-butadiene copolymer has a molecular weight distribution of 1.5 to 2.1.

* * * * *